United States Patent
Limonov et al.

(10) Patent No.: US 12,238,422 B2
(45) Date of Patent: Feb. 25, 2025

(54) METHOD OF CONSTRUCTING FRONT PANORAMA OF SHELVING FROM ARBITRARY SERIES OF FRAMES BASED ON SHELVING 3D MODEL

(71) Applicant: SAMSUNG ELECTRONICS CO., LTD., Suwon-si (KR)

(72) Inventors: Alexander Georgievich Limonov, Moscow (RU); Ilia Igorevich Belikov, Moscow (RU); Anton Sergeevich Konushin, Moscow (RU); Grzegorz Kisala, Warsaw (PL); Piotr Kacper Wierzba, Warsaw (PL); Radoslaw Pawel Chmielewski, Warsaw (PL); Kamil Przybyla, Warsaw (PL)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 315 days.

(21) Appl. No.: 18/070,998

(22) Filed: Nov. 29, 2022

(65) Prior Publication Data
US 2023/0232110 A1    Jul. 20, 2023

(30) Foreign Application Priority Data
Jan. 14, 2022   (RU) ................ 2022100756

(51) Int. Cl.
*H04N 23/698*       (2023.01)
*G06T 7/50*         (2017.01)
(Continued)

(52) U.S. Cl.
CPC ............ *H04N 23/698* (2023.01); *G06T 7/50* (2017.01); *G06T 7/70* (2017.01); *G06T 17/20* (2013.01);
(Continued)

(58) Field of Classification Search
CPC .......... H04N 23/698; G06T 7/50; G06T 7/70; G06T 17/20; G06T 2207/10024; G06V 10/16
See application file for complete search history.

(56) References Cited

U.S. PATENT DOCUMENTS

| | | | |
|---|---|---|---|
| 6,304,284 | B1 | 10/2001 | Dunton et al. |
| 7,460,730 | B2 | 12/2008 | Pal et al. |
| (Continued) | | | |

FOREIGN PATENT DOCUMENTS

| | | |
|---|---|---|
| RU | 2601165 C2 | 10/2016 |
| RU | 2606310 C2 | 1/2017 |
| WO | 2008/150153 A1 | 12/2008 |

OTHER PUBLICATIONS

Communication dated Nov. 9, 2022 issued by the Russian Patent Office for Russian Patent Application No. 2022100756.
(Continued)

*Primary Examiner* — Mohamed A. Wasel
(74) *Attorney, Agent, or Firm* — Sughrue Mion, PLLC

(57) ABSTRACT

The present invention relates to methods for visual display of images of real shelvings with products for analysis of shelving contents. There are provided methods for constructing a shelving front panorama. A method comprises: capturing color image frames of the shelving, displaying the shelving and its contents; reconstructing a shelving 3D model based of depth data and capturing device position data for each frame; determining a projection plane corresponding to the shelving front edge; stitching the color image frames of the shelving by projective transformation of each color image frame of the shelving onto the projection plane. The resulting shelving front panorama displays the shelving and its contents. The disclosure eliminates the need for observing frontal orientation of each shelving image
(Continued)

Frame 1

Frame 2

Complete image after stitching frame when capturing images of the shelving; the capturing can be made along an arbitrary path.

10 Claims, 11 Drawing Sheets

(51) Int. Cl.
    *G06T 7/70*     (2017.01)
    *G06T 17/20*     (2006.01)
    *G06V 10/10*     (2022.01)

(52) U.S. Cl.
    CPC .... *G06V 10/16* (2022.01); *G06T 2207/10024* (2013.01)

(56) References Cited

U.S. PATENT DOCUMENTS

| | | |
|---|---|---|
| 7,839,429 B2 | 11/2010 | Williams et al. |
| 9,251,590 B2 | 2/2016 | Sharp et al. |
| 10,360,532 B2 | 7/2019 | Chen et al. |
| 10,429,833 B2 | 10/2019 | Schulz et al. |
| 10,511,768 B2 | 12/2019 | Graham et al. |
| 10,565,548 B2 | 2/2020 | Skaff et al. |
| 10,769,582 B2 | 9/2020 | Williams et al. |
| 2009/0290013 A1* | 11/2009 | Hayashi ............ H04N 5/85 348/E7.001 |
| 2014/0211015 A1 | 7/2014 | Meadow et al. |
| 2018/0005176 A1 | 1/2018 | Williams et al. |
| 2018/0300854 A1 | 10/2018 | Dmitrenko |
| 2020/0380715 A1* | 12/2020 | Chan ............ G01S 17/86 |
| 2022/0051177 A1* | 2/2022 | Savvides ............ G06F 18/214 |
| 2022/0051179 A1* | 2/2022 | Savvides ............ G06F 16/583 |
| 2022/0083959 A1* | 3/2022 | Skaff ............ G06V 20/52 |
| 2022/0374855 A1* | 11/2022 | Balaoro ............ G06Q 20/401 |
| 2023/0232110 A1* | 7/2023 | Limonov ............ G06T 17/00 |

OTHER PUBLICATIONS

Izadi et al., "KinectFusion: Real-time 3D Reconstruction and Interaction Using a Moving Depth Camera," UIST'11, Oct. 16-19, 2011, Santa Barbara, CA, USA, 2011, Total 10 pages.

* cited by examiner

Frame 1    Frame 2    Complete image after stitching

METHOD OF CONSTRUCTING FRONT PANORAMA OF SHELVING FROM ARBITRARY SERIES OF FRAMES BASED ON SHELVING 3D MODEL

CROSS-REFERENCE TO RELATED APPLICATION

This application is based on and claims priority under 35 U.S.C. § 119 to Russian Patent Application No. 2022100756, filed on Jan. 14, 2022, in the Russian Intellectual Property Office, the disclosure of which is incorporated by reference herein in its entirety.

BACKGROUND

1. Field

The present disclosure relates to methods for visual display of images of real shelvings with products for analysis of shelving contents.

2. Description of Related Art

Currently, the field of video analytics of products and retail shelving is under active development. Competition of retail chains gives rise to development of new approaches to attract customers. Computing capacities are rapidly increasing and getting cheaper, and at the same time new processing facilities appear, which are applicable also in trade. Video analytics of retail shelving contributes to quick analysis of where and what products are running out, what products are not in their proper places, and what products are in good supply. Hypermarkets contain thousands of products on their shelves, while, statistically, the average attendance of hypermarkets ranges from 16,000 to 18,000 people per day, so process design solutions for quick analysis of capacities of their shelves are needed to alert the staff about products missing on the floor, but available in the store warehouse, products to be added, and products being in good supply on the shelves.

Various methods for scanning shelves with products in a store are known. For example, cameras that capture store shelves in real time may be disposed on the shelves opposite the shelves being captured. Also, a store employee can walk along the shelves and take pictures of the shelves with a mobile device. Robotic platforms equipped with cameras can be used; the platforms move between the shelves while capturing images thereof with camera.

To facilitate matching the real shelving with a planogram, generally comprising a frontal image of the shelving, the image of real shelving position should coincide with the image on the planogram. Thus, the captured image of real shelves should be frontal and undistorted.

U.S. Pat. No. 10,769,582 B2 (publication date Aug. 9, 2020) discloses a system with multiple cameras for dynamic inventory monitoring. The camera system for inventory monitoring includes a movable base that supports multiple cameras. The multiple cameras are directed toward the shelves to take a series of pictures along aisle of a retail store or warehouse. A processing module is operable to construct a real time or near real time inventory mapping of products positioned on the shelving. This information can be transferred to remote locations to simplify and speed up product ordering, and assist in maintenance of appropriate product stock levels. The drawback of the system is that the movable base is not always able to move precisely in parallel with the shelving (due to the need to avoid obstacles or the inability of passing along a given path), that is, the shelving panorama is distorted compared to the planogram.

U.S. Pat. No. 10,511,768 B2 (publication date Dec. 17, 2019) discloses a system and method enabling the capture of a series of images to generate a single linear panoramic image. The method includes capturing an image, dynamically comparing the captured image with a preview image on a display of a capture device until a predetermined overlap threshold is satisfied. The drawback of the above-mentioned method is that the user is unable to move camera precisely in parallel with the shelving, that is, the shelving panorama produced by classical computer vision algorithms may be distorted compared to the planogram.

Thus, there is a need for a system that could generate an image of a real shelving in a precisely frontal orientation based on capturing the shelving as the camera moves along an arbitrary path along the shelving, for example, capturing video or a series of frames, to simplify the analytical task of combining the image of real shelves of the shelving with the planogram thereof.

SUMMARY

A method of constructing a front panorama of shelving may be provided. The method may include capturing, by at least one capturing device, at least two color image frames of shelving, each of the color image frames of the shelving displaying the shelving and shelving contents; determining changes in a capturing position of the at least one capturing device from an initial capturing position of the at least one capturing device at a starting point of color image frames of the shelving; determining a path of the at least one capturing device based on the change in the capturing position; determining a depth of each captured color image frame of the shelving; reconstructing a shelving 3D model as a 3D mesh based on the depth of each captured color image frame and the capturing position of the at least one capturing device for each color image frame of the shelving; selecting from the 3D mesh only faces that are perpendicular to a horizontal plane and for which the following condition may be satisfied $n*g<\varepsilon$, $y<\varepsilon$, where vector $n(x,y,z)$ is the unit normal vector to a face, vector $g(0,1,0)$ is the gravity vector, $n*g$ is the scalar product of said vectors, $\varepsilon$ is the tending to zero threshold of normal vector deviation; approximating the path of the at least one capturing device to a first approximating straight line; projecting the first approximating straight line onto the horizontal plane; constructing, on the horizontal plane, perpendiculars to the projection of the first approximating straight line; selecting vertices closest to the projection of the first approximating straight line, wherein the selected vertices fall on the perpendiculars when projected onto the horizontal plane; selecting, from said selected vertices, a plurality of vertices, wherein projections of the plurality of vertices onto the horizontal plane are approximated by a second approximating straight line; constructing, perpendicular to the horizontal plane, a projection plane passing through the second approximating straight line; and stitching the at least two color image frames of the shelving by projective transformation of each color image frame of the shelving onto said projection plane to generate a shelving front panorama displaying the shelving and the shelving contents.

The capturing of color image frames of the shelving may be performed by video capturing of the shelving. The capturing of color image frames of the shelving may be performed by frame by frame capturing of the shelving. The capturing device may include a moving platform with cameras mounted thereon. The capturing position of the at least one capturing device may be determined by a tracking camera.

There is also provided an electronic device for constructing a front panorama of shelving, the electronic device including at least one color sensing capturing device having a depth sensor; at least one memory configured to store instructions; at least one processor configured to access the instructions and operate as instructed by the instructions, the instructions including instructions to execute the methods presented herein.

In some embodiments, the electronic device may be a smartphone. In some embodiments, the electronic device may be a camera. In some embodiments, the electronic device may be a video camera.

A non-transitory computer readable medium storing instructions may be provided. The non-transitory computer readable medium storing instructions may include one or more instructions that, when executed by one or more processors of a device for constructing a front panorama of shelving may cause the one or more processors to receive, from at least one capturing device, at least two color image frames of shelving, each of the color image frames of the shelving displaying the shelving and shelving contents; determine changes in a capturing position of the at least one capturing device from an initial capturing position of the at least one capturing device at a starting point of color image frames of the shelving; determine a path of the at least one capturing device based on the change in the capturing position; determine a depth of each captured color image frame of the shelving; reconstruct a shelving 3D model as a 3D mesh based on the depth of each captured color image frame and the capturing position of the at least one capturing device for each color image frame of the shelving; select from the 3D mesh only faces that are perpendicular to a horizontal plane and for which the following condition is satisfied—$n*g<\varepsilon$, $y<\varepsilon$, where vector $n(x,y,z)$ is the unit normal vector to a face, vector $g(0,1,0)$ is the gravity vector, $n*g$ is the scalar product of said vectors, $\varepsilon$ is the tending to zero threshold of normal vector deviation; approximate the path of the at least one capturing device to a first approximating straight line; project the first approximating straight line onto the horizontal plane; construct, on the horizontal plane, perpendiculars to the projection of the first approximating straight line; select vertices closest to the projection of the first approximating straight line, wherein the selected vertices fall on the perpendiculars when projected onto the horizontal plane; select, from said selected vertices, a plurality of vertices, wherein projections of the plurality of vertices onto the horizontal plane are approximated by a second approximating straight line; construct, perpendicular to the horizontal plane, a projection plane passing through the second approximating straight line;

and stitch the at least two color image frames of the shelving by projective transformation of each color image frame of the shelving onto said projection plane to generate a shelving front panorama displaying the shelving and the shelving contents.

BRIEF DESCRIPTION OF THE DRAWINGS

The aforementioned and other features and advantages of the present disclosure are explained in the following description illustrated by the drawings, in which.

DETAILED DESCRIPTION

The present disclosure provides a method of constructing a linear panorama of a shelving from an arbitrary series of shelving image frames using a shelving 3D model. The disclosure produces an undistorted frontal image of the shelving when capturing images of the shelving with a camera at any angle while moving along an arbitrary path.

Planogram is a supermarket internal document containing information on how products should be arranged on shelving; the document comprises a layout of product arrangement on the shelving. Filling a real shelving with products in a store should correspond to the planogram, so the real shelving is compared to the planogram, for example, when inspecting and replenishing products on the shelves, generally done several times a day.

To compare the arrangement of real products on a real shelving in a store with the existing planogram, a shelf panorama is obtained, for example, by photographing the shelf. The comparison involves determining the correctness of filling real shelvings with products, the need to replenish products on the shelving, and the necessity to rearrange products on the shelving.

The shelving panorama should be presented in the same form as the planogram. Generally, to compare with the planogram and to match the planogram, the real shelving during scanning (capturing) should be positioned frontally, so that when comparing, all shelves on the shelving could be marked with vertical and horizontal lines.

For analysis, the image of a real shelving with shelves is aligned with the shelving planogram. Also, information on the depth of the real shelf of the shelving can be used to determine empty space on the real shelf, that is, the occupancy of the shelf. Both conventional methods require constructing a panoramic image of a real shelving with shelves in frontal orientation to simplify the analytical task of aligning images of the generated panoramic image with the planogram.

Figure 1:
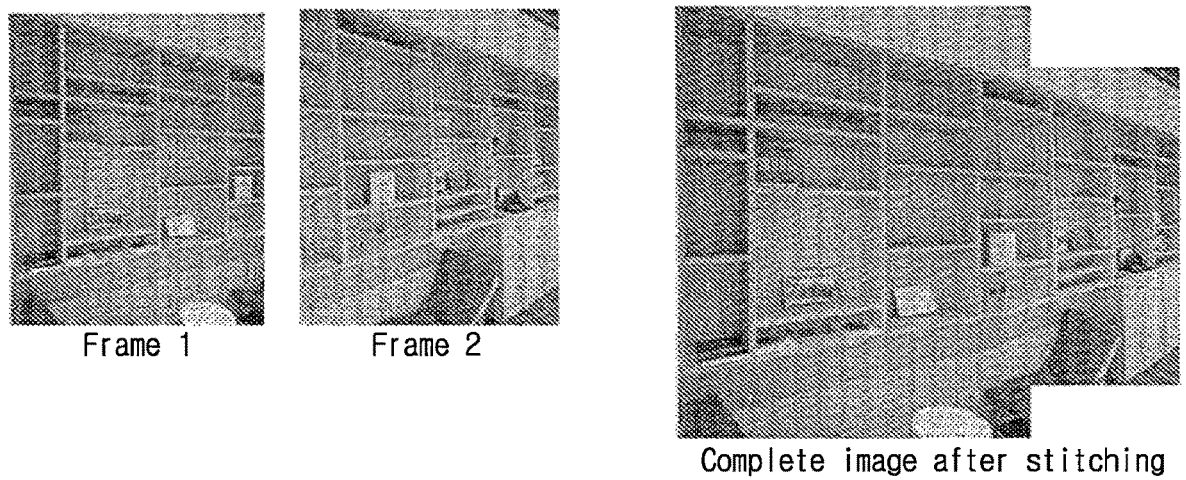
FIG. 1 shows that when a panoramic image is generated using related computer vision algorithms, the first image specifies the orientation angle of the entire image.

To obtain a high-quality panoramic image, the images captured from neighboring angles should be exactly aligned with each other along the edge, that is, the images should be stitched. Moreover, orientation of the entire panoramic image will depend on the orientation of the first image frame (Frame 1 in FIG. 1). As shown in FIG. 1, if a part of the shelving in Frame 1 is captured at an angle, then subsequent image frames of the next parts of the shelving should also be captured at the same angle to enable alignment (superposition) of edges of the images and to generate a complete undistorted panoramic image of the real shelving.

Figure 2:
FIG. 2 is a distorted frontal image when related methods of image stitching and arbitrary camera movement along a complex path are used.

As known in the art, to generate a frontal panoramic image of a shelving, camera should move along the shelving precisely in parallel with and precisely at the same distance from the shelving, otherwise the frontal panoramic image will be distorted and untrue, as shown in FIG. 2, and will not match the planogram image. In this case, qualitative comparison of a predetermined planogram with a real shelving image will be impossible. According to the prior art, to avoid distortion of the shelving image, the shelving with shelves should be positioned in parallel with the camera. The shelving image is preferably captured completely without a cropped area, that is, the entire shelving is to be captured in a single image to avoid misalignment of image frames when stitched.

Alternatively, individual image frames of the shelving, showing shelving parts, can be analyzed. But in this case some products may be counted more than once if they fall in multiple different images of the shelving, while some other products may be fully omitted in the frames. Therefore, most commonly the entire shelving is analyzed to ensure that all products and items located on the shelves are taken into account at once. Moreover, when the entire shelving fits in the camera field of view, only one image of the shelving can be used, which is immediately done compatible with the planogram for quick and accurate comparison.

The embodiments of the present disclosure eliminate the need to observe frontal orientation of each shelving image frame when capturing the shelving, that is, vertical and horizontal lines of the real shelving in the frame need not be parallel with the image boundaries in the frame, as required in the prior art.

To compare the obtained frontal shelving image with the planogram, the orthographic projection method can be used, that is, superimposition of the obtained frontal shelving image on the planogram to detect differences, so that misalignments between the image of the real shelves and the shelves on the planogram can be easily detected, since the real shelving image will be undistorted. Orthographic projection is a known means of representing three-dimensional objects in two dimensions, since orthographic projection is a form of parallel projection, in which all projection lines are orthogonal to the projection plane. Orthographic projection saves all straight lines of real image, including their parallel and perpendicular arrangement. For comparison, in the perspective view of the shelving shown in FIG. 1, the property of parallel alignment of lines is not maintained to obtain superimposed frames, and in the case of other projections, for example, as shown in FIG. 2, straight lines can generally curve. The use of orthographic projection in the comparison of the shelving panoramic image increases the speed and improves the quality of comparison of the real shelving with the planogram.

The process of generating a linear shelving panorama may include two operations: capturing image frames of the shelving with shelving contents, and then processing the image frames. Before processing the image frames, the user should complete capturing images of the entire shelving with products; analysis, processing and comparison are carried out after the image capturing is completed.

According to the present disclosure, a real shelving with its contents can be captured from an arbitrary camera angle, and both the frames of color video capturing and the frame by frame color capturing of the shelving can be used. With this, each frame shows the shelving and shelving contents.

On average, for an arbitrary camera path at least two images of the shelving with shelving contents should be used, optimally 100-500 images, depending on the shelving size.

Based on the captured image frames, 3D reconstruction of the shelving with its contents is performed; for this, any known 3D reconstruction algorithm based on the captured image frames can be used. For example, the conventional KinectFusion reconstruction algorithm can be used, which can restore a 3D scene in real time based on the algorithm data. In this case, data from the camera are input to the machine 3D reconstruction algorithm in the form of pairs representing camera position data and depth data from the depth sensor. Camera for capturing a shelving must be color sensitive and have a depth sensor; such cameras are known in the art, for example, and not limited to, smartphones Samsung Galaxy S10+5G, Note 10+, S20+ or S20 Ultra, Samsung Galaxy S20+, which have a color sensitive camera and a depth sensor; moreover, a separate camera, for example, Intel RealSense L515, D 415 and others, and Microsoft Azure Kinect, etc. with depth sensor, and any suitable devices can be used.

To take pictures of the shelving according to the present disclosure, a single capturing device, for example, a camera is sufficient. In another embodiment, multiple capturing devices mounted on a moving platform can be used. To generate a panorama of the shelving with its contents, i.e. the shelving front image, for each capture it is necessary to estimate the camera position from which the picture was captured; camera position can be estimated by the tracking algorithm (SLAM) https://ru.wikipedia.org/wiki/SLAM (%D0%BC%D0%B5%D1%82%D0%BE%D0%B4). Such algorithms are known in the art, for example, the ARCore application can be used, which can determine capturing device path, https://developers.google.com/ar/develop/fundamentals#motion tracking.

Advanced SLAM systems, such as ARCore or Intel RealSense T265 tracking camera, use data from accelerometer and gyroscope and data from a camera or multiple cameras. They detect changes in the capturing device position relative to the initial position taken by the capturing device at the starting point of capturing color image frames of the shelving. Then, the capturing device path is determined from the changes in the capturing device position. Changes in the camera position are calculated relative to the initial position (at switch on) of the camera.

If a moving platform with cameras is used to capture images of a shelving, any suitable means can be employed to determine the camera position, for example, a position sensor or Intel RealSense T256 tracking camera https://www.intelrealsense.com/tracking-camera-t265/.

According to the conventional technique for constructing a 3D image model from image snapshots, a virtual volume is initialized in memory of the computing device, which performs calculations, to reconstruct the object (in our case, shelving). All depth measurements are projected into this volume, that is, a depth map is formed, Truncated Signed Distance Function. The techniques are well known in the art, for example, from the article of KinectFusion, Volumetric Representation section (Shahram Izadi, David Kim, Otmar Hilliges, David Molyneaux, Richard Newcombe, Pushmeet Kohli, Jamie Shotton, Steve Hodges, Dustin Freeman, Andrew Davison, and Andrew Fitzgibbon 2011; KinectFusion: real-time 3D reconstruction and interaction using a moving depth camera. In Proceedings of the 24th annual ACM symposium on User interface software and technology (UIST '11), Association for Computing Machinery, New York, NY, USA, 559-568. DOI: https://doi.org/10.1145/2047196.2047270.

Upon projecting all of the depth measurements obtained from the depth sensor for all images into the virtual volume based on the obtained depth map, a field defining a 3D surface is obtained. To convert this field specifically to a 3D model, a conventional algorithm is used, for example, Marching Cubes algorithm for constructing 3D mesh of a 3D object, in this case the shelving. This operation uses data from the camera's depth sensor and camera position data.

The algorithm for constructing a shelving 3D model is a standard algorithm, which outputs a 3D image in the form of a 3D mesh consisting of triangular faces formed by sides and vertices, where the 3D mesh repeats 3D (volumetric) shape of the shelving, which is a standard representation of 3D objects on a computer, describing the geometric shape of an object, in this case a shelving. It should be noted that the resulting 3D model is oriented relative to the horizontal plane exactly as the real shelving is positioned relative to the horizontal plane, and the gravity direction can be determined by accelerometer during estimation of the camera position when capturing each frame. Therefore, an accelerometer is used during tracking (tracking the camera position during capturing), and the coordinate system during tracking is chosen such that the Y axis is directed along the gravity vector, which is done by known techniques. In computer vision, the coordinate system is associated with the camera, where the X axis is directed horizontally, the Y axis is directed vertically down, and the Z axis is directed away from the observer. It should be noted that it does not matter where the origin of coordinates is located and how it is chosen, generally the initial position of the camera (capturing device) starting the capture is chosen as the origin of coordinates, but this is not necessary.

Figure 3A:
FIG. 3A is a shelving 3D models generated according to embodiments of the present disclosure based on camera's depth sensor data and camera position data.
Figure 3B:
FIG. 3B is an enlarged fragment of the shelving 3D model in FIG. 3A according to embodiments of the present disclosure.

Based on series of captured frames of the shelving with depth maps, with camera position known for each image, a shelving 3D model is constructed, the real shelving 3D model being in the form of a 3D mesh. FIG. 3A shows a computer 3D model of the shelving with its contents, generated from camera depth sensor data and camera position data. FIG. 3B shows an enlarged fragment of the 3D model, where a part of the shelf with contents is clearly seen as 3D model with visible vertices and triangular faces of the 3D mesh.

Figure 4:
FIG. 4 is the projection of all points of shelving 3D reconstruction onto the horizontal plane, according to embodiments of the present disclosure.

FIG. 4 shows the computer projection of all points of the shelving 3D model on the horizontal plane. The clearly visible main black part shows the location of the shelving main part with contents; this part contains the largest number (majority) of points of the shelving 3D model. FIG. 4 illustrates all the parts protruding from the shelving main part, that is, from the most saturated black part. The protruding parts of the shelving with contents are visible as blurry interrupted spots; they can be products protruding from the shelves, as well as parts of the floor in front of the shelving caught in the captured images.

Figure 5:
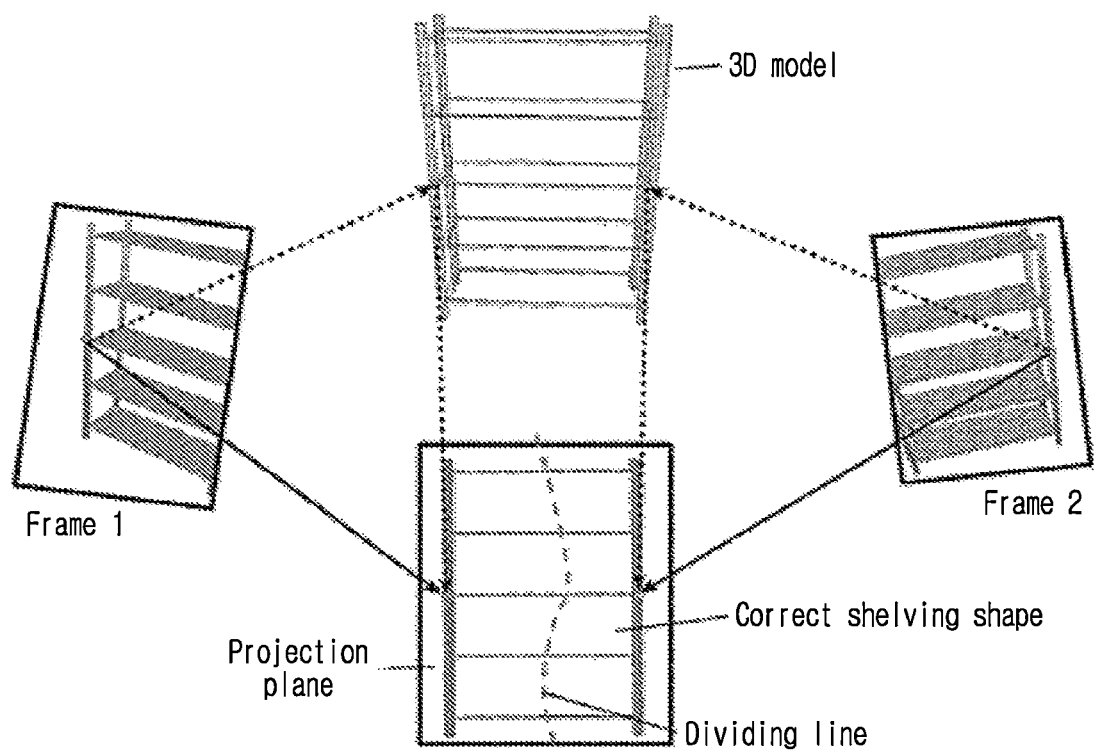
FIG. 5 shows schematically how a projection plane is generated, according to embodiments of the present disclosure.

In the next operation, a projection plane passing along the front edge of the shelving 3D model is virtually constructed, as schematically illustrated in FIG. 5.

This operation comprises:
1) Setting the condition that
   the shelving has a "correct shape", i.e. it has right angles and does not have shelves protruding either forward, or to the side, or backward;
   shelving posts (which support the shelving) are upright, while shelves of the shelving are parallel with the horizontal plane.
2) By analysis of the shelving 3D model, selecting (using machine algorithms) a projection plane, onto which all of the shelving image frames will be orthographically projected to construct the shelving panorama.

Using machine algorithms, filtering is performed in the direction of face normals, that is, only the faces perpendicular to the horizontal plane are selected from the reconstructed shelving 3D model (FIGS. 3A, 3B). To verify this condition, the scalar product of the gravity vector and the normal vector to the shelving is taken. If these vectors are perpendicular to each other, then the scalar product is zero, and if they are almost perpendicular, which is more suitable for real case, the product will tend to zero. Tending to zero threshold (ε) of deviation of the normal vector n(x,y,z) to the shelving is chosen, and it is considered that if the scalar product is less than the threshold (ε), then the normal vector is perpendicular to the gravity vector g(0, 1.0) (or parallel with the horizontal plane). That is, if vector n(x,y,z) is the unit normal vector n(x,y,z) to the face, and vector g(0,1,0) is the gravity vector, ε is the tending to zero threshold of the normal vector deviation, then a face perpendicular to the horizontal plane will satisfy the condition:

$$n*g<\varepsilon$$

$$y<\varepsilon,$$

y is the coordinate, i.e. the y coordinate of vector n.

Figure 6:
FIG. 6 is the projection of shelving 3D reconstruction points after filtering in the direction of face normals, according to embodiments of the present disclosure.

This condition allows filtering (eliminating) object points that obviously do not belong to the faces of the shelving 3D model, perpendicular to the horizontal plane, for example, parts of the floor in front of the shelving that have been caught in the captured image frames. Only parts of the shelving and its contents that have the appropriate orientation remain, that is, the shelving points located on the planes perpendicular to the horizontal plane. FIG. 6 shows projections of vertices of selected faces of the 3D shelving model onto the horizontal plane, which were filtered out in this way. FIG. 6 clearly emphasizes the main black part consisting of the cluster of large number of projections of selected face vertices onto the horizontal plane.

As seen in FIG. 6, some projections of the selected face vertices are located above the main cluster of large number of projections of the selected face vertices, that is, in the depth of the shelving. It is also seen that some projections of the selected face vertices are located below the main cluster of the largest number (majority) of projections of the selected face vertices, that is, go beyond the shelving front edge.

Figure 7:
FIG. 7 is the projection on the horizontal plane of face vertices after eliminating vertices of the faces located in the depth of the shelving, according to embodiments of the present disclosure.
Figure 8:
FIG. 8 is a projection plane passing along the shelving front edge, shown as projection on the horizontal plane in FIG. 7, according to embodiments of the present disclosure.

For clarity, FIG. 7 shows projections of face vertices onto the horizontal plane, remained after elimination of face vertices of the objects in the depth of the shelving. There is clearly seen the main cluster of the majority of the vertices projections, shown by broken line, and projections of parts (i.e. selected face vertices of these parts) that extend beyond the shelving front edge. Of these vertices, the machine algorithm will ignore the minority of vertices belonging to the objects protruding beyond the shelving front edge and select only the majority of vertices, which will correspond to the selected face vertices belonging to the shelving front edge; in FIG. 8 such vertex projections are connected by straight line. Therefore, only the vertices, which belong to the main cluster of the majority of projections of selected face vertices, remain, since when projected onto the horizontal plane they lay on the same straight line, i.e. belong to the same plane, which is perpendicular to the horizontal plane. The desired projection plane is virtually constructed through the selected vertices; in FIG. 8, the straight line connecting the selected projections of the selected face vertices is the projection of the found projection plane onto the horizontal plane. The machine algorithm takes into account only the majority of vertices of the main cluster, thereby eliminating vertices belonging to the faces located in the shelving depth and eliminating vertices belonging to the faces protruding beyond the shelving front edge. These vertices are filtered out by the machine algorithm comprising: approximating the capturing device path to a first approximating straight line, and then projecting the first approximating straight line onto the horizontal plane. On the horizontal plane, perpendiculars to the projection of the first approximating straight line are constructed, then the vertices closest to the projection of the first approximating straight line are selected, which, when projected onto the horizontal plane, fall on said perpendiculars. Of the mentioned selected vertices, only the majority of vertices are selected, the projections of which onto the horizontal plane can be approximated by a second approximating straight line. Then, a projection plane passing through the second approximating straight line is constructed perpendicular to the horizontal plane.

3) Stitching image frames, using the already captured shelving image frames, which were also used in the previous operations. To do this, projective transformation (known from the prior art) of each image frame onto the projection plane determined at the previous operation is found taking into account camera position for each image. That is, an algorithm is simulated, in which color image frames are virtually projected from the camera position taken when the frame was captured onto the found projection plane; such techniques are known in the art.

Figure 9:
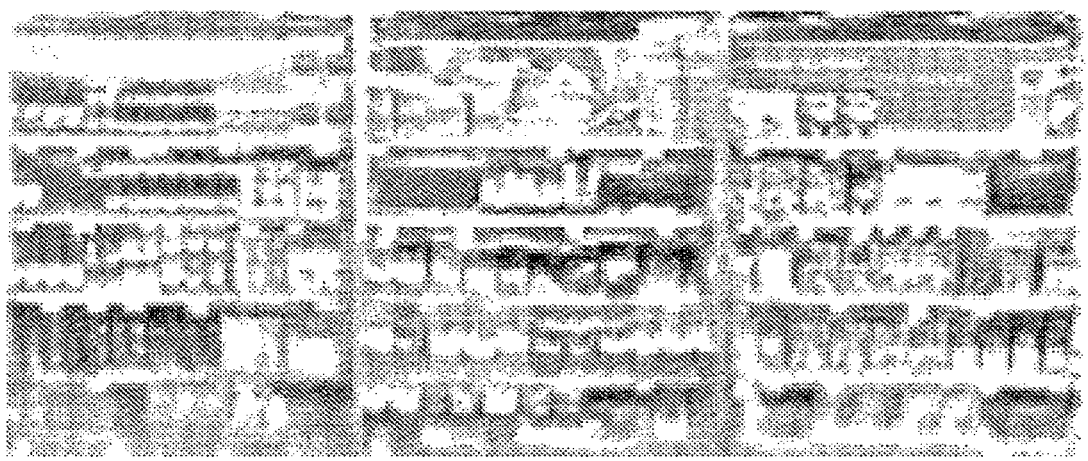
FIG. 9 is a shelving front panorama generated according to embodiments of the present disclosure.

As the found projection plane coincides with the shelving front edge (frontal plane of the shelving edge), all of the shelving color image frames projected from their positions are mapped on this projection plane, thereby forming in a flat frontal color image of the shelving with its contents, as shown in FIG. 9, the general view of which coincides with the planogram.

Differences between shelving contents on the planogram and on the resulting shelving image are easily determined by conventional methods. For example, a conventional product detection algorithm can compare products on the planogram and on the obtained shelving front panorama. Or, having found an empty space on the obtained front panorama of the shelving using the planogram, one can find out exactly which product should be in this place. The search for differences between the planogram and the resulting real shelving panorama is not the subject of the present disclosure.

Figure 10:
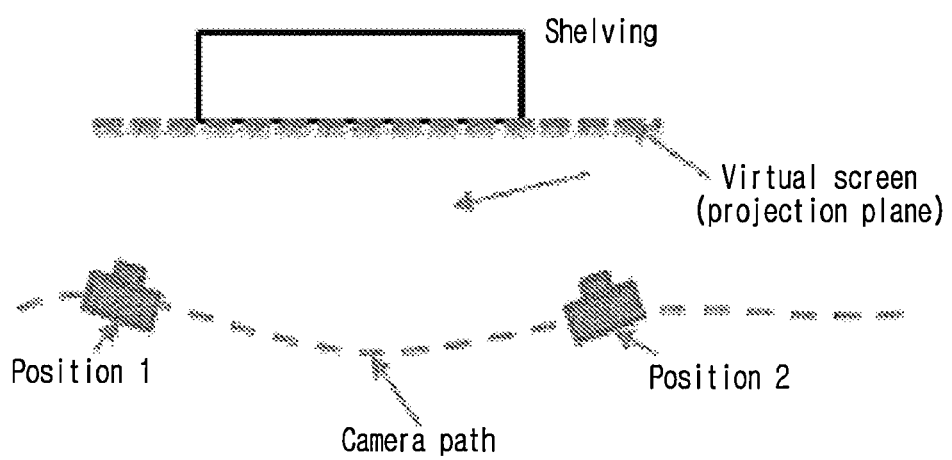
FIG. 10 shows how overlapping images on the projection plane are produced, according to embodiments of the present disclosure.

Although the final frontal image of the shelving is constructed using the machine algorithm, for a better understanding of the idea, the operations of generating images on the found projection plane will be described (FIG. 10).

For example, two shelving image frames are captured from different angles. In FIG. 10, virtual projectors are positioned at the capturing points, i.e. Position 1 and Position 2. Instead of the shelving front edge, a virtual screen is arranged, which is the projection plane. After pre-projecting captured image frames onto the virtual screen, two overlapping partial images of the shelving are obtained, which should be joined into a common panorama. Since the images overlap, it is necessary to find the dividing line between them (see FIG. 5) and determine for each overlapping part the correct (desired) part of the image from each frame. These operations form a standard conventional method of stitching a panoramic image to form a final panoramic image of the shelving, see, for example, the publication https://yuli.github.io/paper/eg13_stitching.pdf.

Orientation of the final panoramic image is ensured by the selection of the projection plane found in Operation 2, since the selected projection plane coincides with the shelving front edge and is oriented perpendicular to the horizontal plane, ensuring the same required orientation of images.

Therefore, the main operations of generating a shelving panoramic image include:

1. Capturing Image Frames of a Shelving

The user captures a set of image frames of a shelving. Depth data can be obtained using a depth sensor or estimated from color images using the conventional SfM technique; description of the algorithm can be found, for example, in the publication https://en.wikipedia.org/wiki/Structure from motion.

The tracking algorithm (SLAM) is used to determine position of the camera; camera positions are tracked relative to the initial position of the camera, and the camera path is determined from changes in the camera position.

2. Constructing a 3D Model of Shelving 3D model of the shelving is reconstructed by combining depth data with known camera positions. Frontal plane of the shelving (shelving front edge) is determined on the reconstructed 3D model of the shelving.

3. Determining the Projection Plane Coinciding with Frontal Plane of Shelving Edge All points are filtered out from the shelving 3D model and only those lying on 3D projection faces perpendicular to the horizontal plane are left.

Only those face vertices are selected, which remain after said selection of faces, the majority of which, when projected onto a horizontal plane, will be at minimum distances from the projection onto the horizontal plane of the first approximating straight line of the capturing device path, and a projection plane passing through the selected face vertices and perpendicular to the horizontal plane is constructed.

4. Generating Panorama of the Shelving (Stitching)

The selected shelving image frames are projected onto the shelving projection plane using projective transformation. Using the known camera positions from which the capture was made, color images of the shelving are projected onto the plane found in the previous operation by projective transformation. To this end, a camera or cameras are used, which have the same parameters and are moving along the same path as those used when the shelving image frames are captured. Image projections are constructed using known camera parameters such as focal length, etc.; projection methods are known in the art and are not the subject of the present disclosure. Thereby the shelving front panorama is generated, which can be easily and quickly compared with the planogram.

Although the present disclosure has been described in connection with some illustrative embodiments, it will be understood that the disclosure is not limited to those specific embodiments. On the contrary, the disclosure is intended to include all alternatives, modifications and equivalent arrangements as may be included within the spirit and scope of the claims.

In addition, the disclosure includes all equivalents of the invention, even if the claims are amended during the examination procedure.

What is claimed is:

1. A method of constructing a front panorama of shelving, the method comprising:
   capturing, by at least one capturing device, at least two color image frames of shelving, each of the color image frames of the shelving displaying the shelving and shelving contents;
   determining changes in a capturing position of the at least one capturing device from an initial capturing position of the at least one capturing device at a starting point of color image frames of the shelving;
   determining a path of the at least one capturing device based on the change in the capturing position;
   determining a depth of each captured color image frame of the shelving;
   reconstructing a shelving 3D model as a 3D mesh based on the depth of each captured color image frame and the capturing position of the at least one capturing device for each color image frame of the shelving;
   selecting from the 3D mesh only faces that are perpendicular to a horizontal plane and for which the following condition is satisfied:

$n*g<\varepsilon,$ $y<\varepsilon,$ where vector n(x,y,z) is the unit normal vector to a face, vector g(0,1,0) is the gravity vector, n*g is the scalar product of said vectors, ε is the tending to zero threshold of normal vector deviation;
   approximating the path of the at least one capturing device to a first approximating straight line;
   projecting the first approximating straight line onto the horizontal plane;
   constructing, on the horizontal plane, perpendiculars to the projection of the first approximating straight line;
   selecting vertices closest to the projection of the first approximating straight line, wherein the selected vertices fall on the perpendiculars when projected onto the horizontal plane;
   selecting, from said selected vertices, a plurality of vertices, wherein projections of the plurality of vertices onto the horizontal plane are approximated by a second approximating straight line;
   constructing, perpendicular to the horizontal plane, a projection plane passing through the second approximating straight line; and
   stitching the at least two color image frames of the shelving by projective transformation of each color image frame of the shelving onto said projection plane to generate a shelving front panorama displaying the shelving and the shelving contents.

2. The method according to claim 1, wherein the capturing comprises video capturing of the shelving.

3. The method according to claim 1, wherein capturing the at least two color image frames comprises frame by frame capturing of the shelving.

4. The method of claim 1, wherein the at least one capturing device is a moving platform with cameras mounted thereon.

5. The method of claim 1, wherein the capturing position of the at least one capturing device is determined by a tracking camera.

6. An electronic device for constructing a front panorama of shelving, the electronic device comprising:
   at least one color sensing capturing device having a depth sensor;
   at least one memory configured to store instructions;
   at least one processor configured to access the instructions and operate as instructed by the instructions, the instructions including instructions to execute the method according to claim 1.

7. The electronic device according to claim 6, wherein the electronic device is a smartphone.

8. The electronic device according to claim 6, wherein the electronic device is a camera.

9. The electronic device according to claim 6, wherein the electronic device is a video camera.

10. A non-transitory computer readable medium storing instructions, the instructions comprising: one or more instructions that, when executed by one or more processors of a device for constructing a front panorama of shelving, cause the one or more processors to:
   receive, from at least one capturing device, at least two color image frames of shelving, each of the color image frames of the shelving displaying the shelving and shelving contents;
   determine changes in a capturing position of the at least one capturing device from an initial capturing position of the at least one capturing device at a starting point of color image frames of the shelving;
   determine a path of the at least one capturing device based on the change in the capturing position;
   determine a depth of each captured color image frame of the shelving;
   reconstruct a shelving 3D model as a 3D mesh based on the depth of each captured color image frame and the capturing position of the at least one capturing device for each color image frame of the shelving;
   select from the 3D mesh only faces that are perpendicular to a horizontal plane and for which the following condition is satisfied:

$n*g<\varepsilon,$ $y<\varepsilon,$ where vector n(x,y,z) is the unit normal vector to a face, vector g(0,1,0) is the gravity vector, n*g is the scalar product of said vectors, ε is the tending to zero threshold of normal vector deviation;
   approximate the path of the at least one capturing device to a first approximating straight line;
   project the first approximating straight line onto the horizontal plane;
   construct, on the horizontal plane, perpendiculars to the projection of the first approximating straight line;
   select vertices closest to the projection of the first approximating straight line, wherein the selected vertices fall on the perpendiculars when projected onto the horizontal plane;
   select, from said selected vertices, a plurality of vertices, wherein projections of the plurality of vertices onto the horizontal plane are approximated by a second approximating straight line;

construct, perpendicular to the horizontal plane, a projection plane passing through the second approximating straight line; and stitch the at least two color image frames of the shelving by projective transformation of each color image frame of the shelving onto said projection plane to generate a shelving front panorama displaying the shelving and the shelving contents.

* * * * *